United States Patent [19]

Slotosch

[11] Patent Number: 4,738,162

[45] Date of Patent: Apr. 19, 1988

[54] PLANETARY GEAR TRANSMISSION

[76] Inventor: Joachim Slotosch, Tulpenweg 5, D 7991 Eriskirch, Fed. Rep. of Germany

[21] Appl. No.: 913,985

[22] Filed: Oct. 1, 1986

[30] Foreign Application Priority Data

Oct. 3, 1985 [DE] Fed. Rep. of Germany ....... 3535253

[51] Int. Cl.[4] .......................... F16H 57/10; F16H 3/44
[52] U.S. Cl. ..................................... 74/781 R; 74/766
[58] Field of Search ............................. 74/781 R, 766

[56] References Cited

U.S. PATENT DOCUMENTS

| 2,792,714 | 5/1957 | Forster | 74/781 R X |
| 3,477,313 | 11/1969 | Ringe | 74/781 R X |
| 4,233,861 | 11/1980 | Gaus et al. | 74/766 X |
| 4,660,439 | 4/1987 | Hiraiwa | 74/766 X |

FOREIGN PATENT DOCUMENTS 931262 7/1963 United Kingdom ............ 74/781 R

Primary Examiner—Dirk Wright
Attorney, Agent, or Firm—McGlew and Tuttle

[57] ABSTRACT

In a planetary transmission (1) with two gearsets (4, 5), with which are coordinated two clutches (13, 14) and a brake (10) to produce different transmission ratios, one of the gearsets (4) is provided with a third clutch (15) to create a fourth shift, by means of which clutch a hollow gear (7) and the first gearset (4) is connectible to the driven shaft (3) when the sun gear (6) is braked and a hollow gear (11) of the second gearset (5) is connected to the driveshaft (2).

7 Claims, 2 Drawing Sheets

PLANETARY GEAR TRANSMISSION

FIELD AND BACKGROUND OF THE INVENTION

The present invention relates in general to gear transmissions, and in particular to a new and useful planetary gear transmission for establishing four or more gear shift positions between two planetary gear sets.

Planetary transmissions are known and also have proven to be successful. By means of the shifting elements provided therein, however, one can shift into three gearshifts only, so that the jumps between gears are sometimes great and the field of application of these known transmissions is limited.

SUMMARY OF THE INVENTION

Accordingly, it is an object of the invention to develop a planetary transmission of the above mentioned kind further, so that it can be used as a four-shift transmission at little additional expense, thereby making it possible to select more favorable gradations between the various transmission ratios than heretofore.

According to the invention this is accomplished in that, in order to create a fourth shift one of the gearsets is provided with a third clutch, by means of which the hollow gear of the first gearset is connectible to the driven shaft when the sun gear is braked and the hollow gear of the second gearset is connected to the driveshaft, or the sun gear of the second gearset is connectible to the driven shaft when the hollow gear is braked and the sun gear of the first gearset is coupled to the driveshaft.

It is expedient here to connect the hollow gear of the first planetary gearset to the driven shaft by means of the third clutch when the hollow gears of both planetary gearsets are coupled to the driveshaft, but it also possible as an alternative to couple the sun gear of the second planetary gearset to the driven shaft when the sun gears of both planetaty gearsets are coupled to the driveshaft.

According to a further development, a fourth clutch may be coordinated with the first or the second gearset, by means of which the planetary gear carrier of the first gear set is connectible to the driven shaft when the hollow gears of both planetary gearsets are coupled to the driveshaft, or the planetary gear carrier of the second gearset is connectible to the driven shaft when the sun gears of both planetary gearsets are coupled to the driveshaft. This is useful when the two gearsets that are provided with a third clutch or with a third and fourth clutch, are arranged in series.

By means of the third clutch provided according to the invention in a two-stage planetary transmission and coordinated either to the hollow gear of the first gearset or to the sun gear of the second gearset, it is thus possible by very simple means to create a fourth gearshift. The structural expense this requires is small, especially since the additional third and possibly also a fourth clutch are to be provided on the driven shaft. Accordingly, favorable gradations in transmission ratios between the various gearshifts can be selected so that the field of application of the planetary transmission designed in accordance with the invention is great.

Accordingly, an object of the present invention is to provide a planetary gear transmission between a drive shaft and a drivenshaft, which includes two planetary gear sets each having elements that are connected to one of the drive and driven shaft through clutches. One of the gearsets is connected to both of the driven and drive shafts by clutches. Each of the planetary gearsets has a sun gear and a ring gear. At least one of the sun and ring gears of one of the gearsets is connectible to a brake for stopping its rotation. By selectively activating the brake and the three or more clutches, four distinct gearshift positions are achievable.

A still further object of the invention is to provide a planetary gear transmission which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWINGS

Two embodiment examples of the planetary transmission designed in accordance with the invention are depicted in the drawings and are explained in detail in the following, The drawings are schematic representations as follows.

DESCRIPTION OF THE PREFERRED EMBODIMENTS

Figure 1:
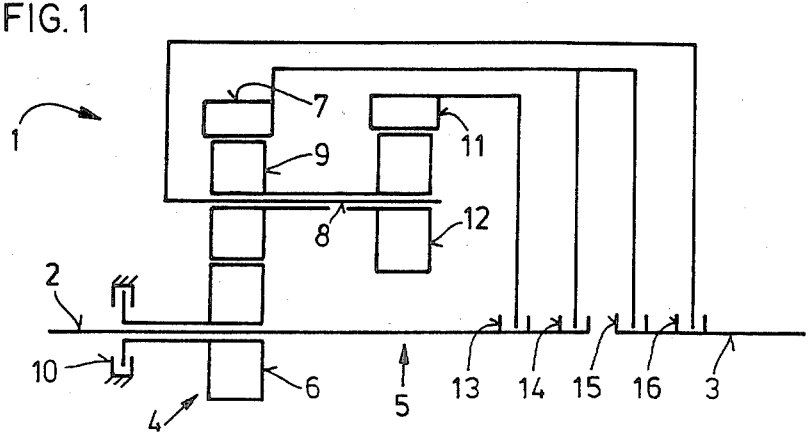
FIG. 1 is a side view of a two-stage planetary transmission with two clutches coordinated with the first gearset.

Referring to the drawings in particular, the invention embodied therein, comprises a planetary gear transmission including first and second planetary gearsets which are selectively connectible by clutches and at least one brake, to drive and driven shafts whose rotations are to be transmitted.

The planetary transmission shown in FIG. 1 and designated 1, contains a driveshaft 2 and a driven shaft 3 and includes two gearsets 4 and 5 whose various members are connectible alternately to the driveshaft 2 by means of clutches 13 and 14 and to the driven shaft 3 by means of clutches 15 and 16. In addition, a brake 10 is provided as a shifting element, by means of which the sun gear 6 of the first gearset 4, which gearset 4 includes ring gear 7 and planet gears 9, is brakable. The planet gear 9 of the first set of gears 4 and the planet gear 12 of the second set of gear 5, which engage with a ring gear 11, are turnably mounted on a common strut 8 and rigidly connected with one another. The strut 8 can be coupled with the drive shfft 3 by means of the clutch 16.

Figure 2:
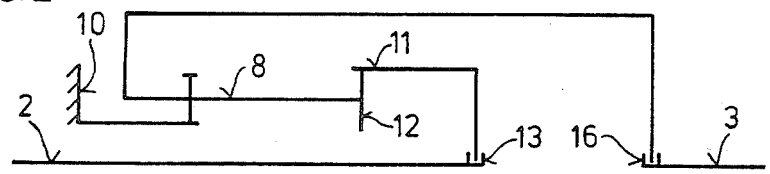
FIGS. 2 to 6 are views showing the various gearshifts of the planetary transmission according to FIG. 1.
Figure 3:
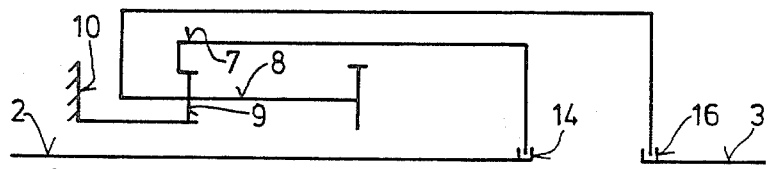
Figure 4:
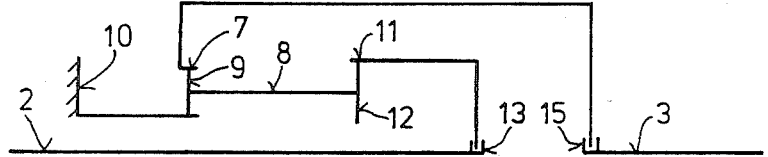

In shifting steps 1, 2 and 3, as shown in FIGS. 2, 3 and 4, respectively, the sun gear 6 of the first set of gears 4 is immobilized by means of the brake 10. In first gear, clutches 13 and 16 (FIG. 2), are closed. In second gear, clutches 14 and 16 (FIG. 3), and in third gear, clutches 13 and 15 (FIG. 4) are closed. The drive power is thus transmitted from drive shaft 2 to driven shaft 3 in first gear via clutch 13, the ring gear 11 of the second set of gears 5 to its planet gears 12 and the common strut 8 via clutch 16, in second gear via clutch 14, the ring gear of the first set of gears 4, its planet gears 9 and the strut 8 also via clutch 16, and in third gear via clutch 13, the ring gear 11 of the second set of gears 5, its planet gears 12 and the strut 8 and the ring gear 7 of the first set of gears 4 and the clutch 15.

Figure 5:
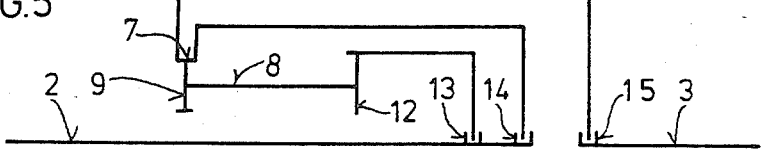
Figure 6:
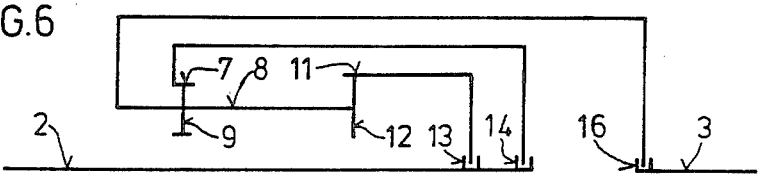

As shown in FIGS. 5 and 6, it is possible to shift into two fourth gear speeds, and for this clutches 13, 14 and 15 or 16 respectively are closed. With gear sets 4 and 5 mutually locked, the drive power is picked up either by the ring gear 7 of the first gear set or by the strut 8. If to planetary gear train 1, by means of which small-scale transmissions are possible, a planetary gear train designed as shown in FIG. 7 is added, it is recommended that the shifting arrangement pursuant to FIG. 6 be selected.

Figure 7:
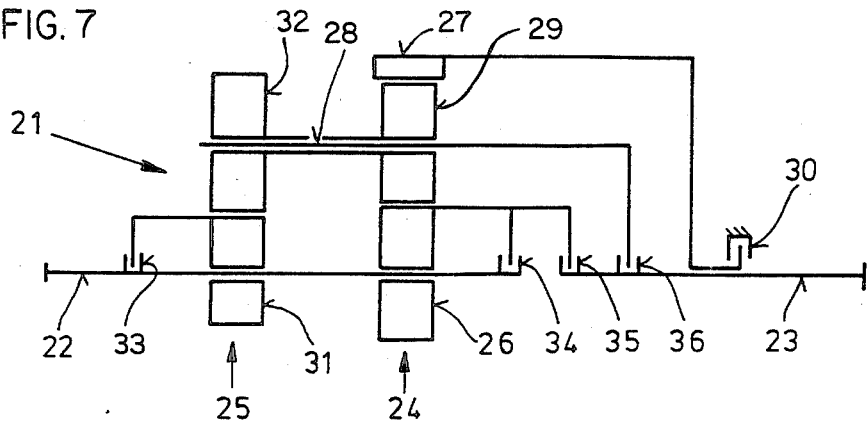
FIG. 7 is a side view of a two-stage planetary transmission with coordinated with the second gearset.
Figure 8:
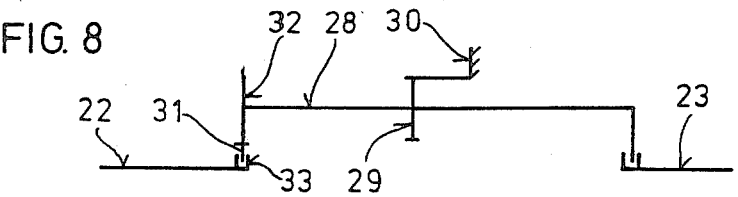
FIGS. 8 to 12 are views showing the various gearshifts of the planetary transmission according to FIG. 7.
Figure 9:
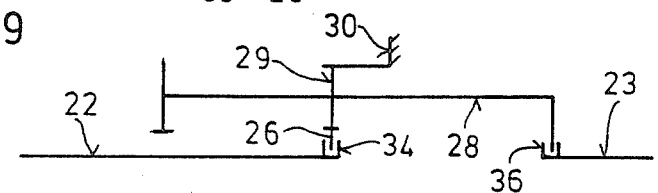
Figure 10:
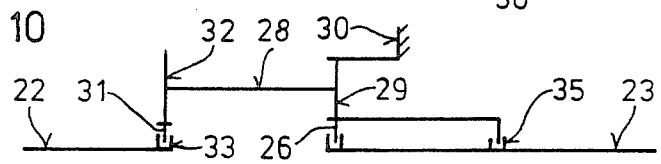
Figure 11:
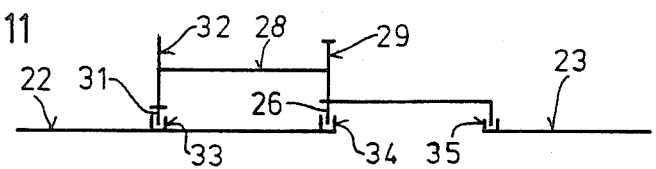
Figure 12:
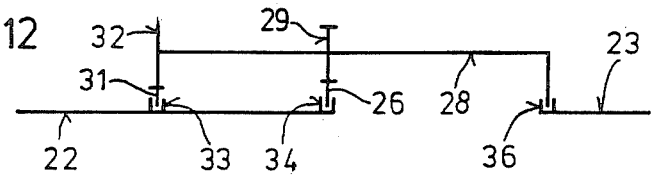

The planetary gear train 21 pursuant to FIG. 7 also consists of two sets of gears 24 and 25, associated with a brake 30 and clutches 33, 34, 35 and 36 mounted on drive shaft 22 and driven shaft 23 and serving as shifting elements. The ring gear 27 of gear set 24 is here immobilized by the brake 30, but in contrast the sun gear 31 of gear set 25 is to be connected with drive shaft 22 be means of clutch 33. The planet gears 29 and 32, rigidly connected to each other are once again turnably mounted on a common strut 28, which can be connected via clutch 36 to the driven shaft 23. And by means of clutches 34 and 35 the sun gear 26 of gear set 24 can be coupled with drive shaft 22 or with driven shaft 23.

In FIGS. 8 through 12, corresponding to the illustrations in FIGS. 2 through 6, are shown only the shifting elements activated in gears 1-3 and in the two fourth gears, respectively. The planetary gear train 21, by means of which large scale transmissions can be effected, is designed similarly and can be shifted like planetary gear train 1 as shown in FIG. 1.

While specific embodiments of the invention have been shown and described in detail to illustrate the application of the principles of the invention, it will be understood that the invention may be embodied otherwise without departing from such principles.

What is claimed is:

1. A planetary gear transmission connected between first and second shafts for transmitting rotation of one shaft to the other shaft at four shift settings, one of said shafts comprising a driveshaft and the other of said shafts comprising a drivenshaft, said transmission comprising:

first and second planetary gearsets, each having a planet gear, at least one gearset having a ring gear meshed with said planet gear thereof and at least one gearset having a sun gear meshed with said planet gear thereof;

a brake engageable with one of said ring and sun gears for stopping rotation thereof to define three of the four shift settings;

a first clutch engageable between said first shaft and the other of said ring and sun gears;

a second clutch engageable between said first shaft and a further gear of said gearset to which said brake is engageable, said further gear being other than said one of said ring and sun gear which is engageable by said brake; and a third clutch comprising at least two elements engageable with each other, said third clutch engageable between said second shaft and said further gear of said gearset to which said brake is engageable, and said third clutch having one of its elements fixed for rotation with the second shaft.

2. A transmission according to claim 1 wherein said first gearset includes said sun gear and said further gear, said sun gear being engageable by said brake and said further gear comprising a further ring gear meshed with said planet gear of said first gearset, said further ring gear being engageable with said second and third clutches.

3. A transmission according to claim 1 wherein said second gearset includes said ring gear and said further gear, said further gear comprising a further sun gear engageable with said second and third clutches, said ring gear of said second gearset being engageable with said brake.

4. A transmission according to claim 1 including a common carrier for carrying said planet gears of said first and second gearsets, said planet gears being connected for rotation with each other and for rotation on said carrier, and a fourth clutch engageable between said second shaft and said carrier.

5. A transmission according to claim 4 wherein said first, second, third and fourth clutches are connected in series to said first and second shafts, said first and second shafts being axially aligned, said sun gear being mounted for rotation on one of said first and second shafts.

6. A transmission according to claim 4 wherein said first gearset includes said sun gear and said further gear, said sun gear being engageable by said brake and said further gear comprising a further ring gear meshed with said plant gear of said first gearset, said further ring gear being engageable with said second and third clutches.

7. A transmission according to claim 4 wherein said second gearset includes said ring gear and said further gear said further gear comprising a further sun gear engageable with said second and third clutches, said ring gear of said second gearset being engageable with said brake.

* * * * *